United States Patent [19]
Okazaki et al.

[11] Patent Number: 6,126,463
[45] Date of Patent: *Oct. 3, 2000

[54] CONTACT APPARATUS FOR A NETWORK

[75] Inventors: Jun Okazaki; Takehiko Okuyama; Yoshihisa Sakazaki, all of Kanagawa-ken, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/852,123

[22] Filed: May 6, 1997

[30] Foreign Application Priority Data

May 7, 1996 [JP] Japan .................................... 8-112615

[51] Int. Cl.[7] ...................................................... H04J 3/12

[52] U.S. Cl. ............................................ 439/188; 370/420

[58] Field of Search ..................................... 370/425, 426, 370/420, 401, 501; 439/188, 502

[56] References Cited

U.S. PATENT DOCUMENTS

| 5,793,764 | 8/1998 | Bartoldus et al. | 370/420 |
| 5,946,319 | 8/1999 | Kobayashi | 370/420 |
| 5,999,532 | 8/1998 | Terasaki | 370/420 |

FOREIGN PATENT DOCUMENTS

| 59-073871 | 4/1984 | Japan . |
| 59-073872 | 4/1984 | Japan . |

OTHER PUBLICATIONS

P1394 Standard for a High Performance Serial Bus (IEEE 139–1995)–pp. 53–65.

*Primary Examiner*—Gary F. Paumen
*Attorney, Agent, or Firm*—Pillsbury Madison & Sutro LLP

[57] ABSTRACT

A contact apparatus for a network in which a plurality of outlets are connected with each other by a repeater through a bus. A cable contains a bus to transmit signals and a power supply line. When the cable is connected with one of the outlets, the device concerned participates in the network and the power supply voltage is supplied to the device. Data can be exchanged between the devices only by connecting the cable with the outlets.

2 Claims, 5 Drawing Sheets

CONTACT APPARATUS FOR A NETWORK

BACKGROUND OF THE INVENTION

Field of the Invention

1. The present invention relates to a contact apparatus for a network according to digital interface standards to be applied to a home electric apparatus.

2. Discussion of Related Art

Accompanying the recent development of multimedia computers and other similar electronic devices, the network system has been widely expanded. Various kinds of network environments have been developed for personal computers. At home, people can enjoy multimedia services which include audio and video devices (hereinafter called AV devices). For example, an interactive television receiver has been developed as a television receiver having the next generation of multimedia services, which includes a CPU and its control software.

However, while interactive televisions and the like have developed, the present network has failed to properly accommodate the next generation of multimedia services. For example, the interactive television is such an apparatus that cannot be connected to the present network bus. In order to accommodate the new multimedia devices, unified standards for digital interface systems for data transmission and reception between a computer and a digital imaging apparatus have been under discussion. As a low cost peripheral interface suitable for multimedia services, the IEEE (The Institute of Electrical and Electronics Engineers) 1394 interface is presently regarded as very promising.

The transmission of multimedia through multiple channels is possible using the IEEE 1394 interface. The IEEE 1394 interface includes an isochronous transmission function which assures the transmission of video and audio data, or the like, within a specified time. Therefore, the IEEE 1394 interface is a digital interface suitable for image transmission.

At present, the standards for the IEEE 1394 interface are being revised and extended under the leadership of the 1394 Trade Association (1394 TA). The IEEE 1394 interface was originally based on computer technology. However, because synchronous communication is possible through such an interface, AV device manufacturers now participate in the preparation of the above-mentioned standards. The proposal of the Digital VCR Conference is now under discussion at the 1394 TA. The EIAR 4.1, or the like, for the purpose of discussing DVB decoders (corresponding to European digital broadcasting) and USA DTV (Digital TV) decoders, has decided to adopt the IEEE 1394 as the interface standard for multimedia services. See, for example, "Comparison of Three New Interfaces Based on Design Concept for Post SCSI" published in Nikkei Electronics 1994. 7.4 (No. 612) pp. 152–163 for the IEEE 1394 standard.

FIGS. 1 and 2 illustrate the interface system of the IEEE 1394 which can perform synchronous transmission and transmission through a plurality of channels. As described on page 162 and thereafter of the Nkkei Electronics article discussed above, multichannel transmission is possible by using the IEEE 1394. FIG. 2 shows an example of data transmission through two channels, namely, channels 1 and 2 (CH1 and CH2) by using a bus corresponding to the IEEE 1394 standard (hereinafter called IEEE 1394 bus). The IEEE 1394 bus can adopt daisy chain topology and tree topology. FIG. 1 illustrates a plurality of devices A through D connected in the form of a daisy chain by means of the IEEE 1394 cable 40 as the IEEE 1394 bus. The devices A through D may be digital VCRs, or other AV devices.

FIG. 2 shows an example of the data transmission from device A to device C, and at the same time from device B to device D. The output from the device A is dubbed at the device C, and at the same time the output from the device B is dubbed at the device D. In the IEEE 1394, data is transmitted at isochronous cycles of 125 $\mu$s.

Line (a) of FIG. 2 illustrates a video stream of the dubbing output from the device A. Such dubbing output is transmitted in each isochronous cycle. Line (c) of FIG. 2 shows a video stream of the dubbing output from the device B. This dubbing output is also transmitted in each isochronous cycle. A plurality of channels are assigned to each isochronous packet. The channel number is inserted in the packet from the devices A and B, which specifies a channel through which the dubbing output is transmitted. Line (e) of FIG. 2 shows the transmission of the output packet from the device A through channel 1 (CH 1) and the transmission of the output packet from the device B through channel 2 (CH2).

The devices A and B output commands shown in lines (b) and (d) of FIG. 2 respectively through the IEEE 1394 cable. As shown in line (e) of FIG. 2, these video streams and commands are multiplexed in each isochronous cycle and transmitted through the IEEE 1394 cable 40. As shown in line (e) of FIG. 2, asynchronous data such as commands, or the like, is multiplexed at each gap between synchronous data (video data) and then transmitted.

The devices C and D determine the transmitted data to be received according to the channel number included in the packet transmitted through the IEEE 1394 cable 40 for its reception. That is, the device C receives the data transmitted through CH 1 and the device D receives the data transmitted through CH2.

As described above, AV devices can be connected with each other through the network bus conforming to the IEEE 1394 standard. It is necessary for an AV device not corresponding to the IEEE 1394 to connect its output devices with its respective input devices through cables. For example, to connect one output device with N input devices, the output device requires at least N cables for the video signal only. With the adoption of the IEEE 1394 digital interface, it is possible to connect the devices in a daisy chain form by installing 1 to 3 IEEE 1394 terminals on each device. As shown in FIG. 1, each device can be connected to up to two other devices through cables 40. Up to 63 devices can be connected by this daisy chain connection.

As described above, with the adoption of the IEEE 1394 digital interface, the complexity of the cable connection can be avoided. However, each device requires an AC power cable in addition to the IEEE 1394 cables, namely, three cables in total.

Generally speaking, since the AC wall outlets are installed at one or several places near the AV devices collectively, it is relatively easy to connect an AC cable with the AC outlet on the wall. However, the IEEE 1394 cable is usually installed on the rear of the devices, so in some cases they must be moved to connect them with each other. As described above, even devices conforming to the IEEE 1394 standards require many cables and their connection is relatively troublesome.

Such cable connection may be simplified by using a cable 40 including the AC cable and the IEEE 1394 cables therein. However, if such a cable is used, only a 1:1 connection is possible.

Incidentally, in IEEE 1394, network settings are reset when the power is turned on. By this resetting process, the connections between devices are confirmed, the master-slave relationship between the devices is set and each device ID is set again.

For the transmission of asynchronous data, such as computer data, resetting the network is not troublesome. However, it becomes a problem for the transmission of image data which must be isochronously transmitted. Since isochronous transmission is not assured by network resetting, the display of image data on a monitor may stop. In the case of VTR dubbing, it is necessary to control VTR recording intermittently. The recording by dubbing is actually impossible. Thus, if power supply to even one device in a network is turned off, the network configuration changes and reconfiguration of the network takes place.

SUMMARY OF THE INVENTION

An object of the present invention is to provide a contact apparatus for a network which simplifies the connection between a plurality of devices.

Another object of the present invention is to provide a contact apparatus for a network which decreases the network reconfiguration frequency.

A contact apparatus for the network according to the present invention comprises a signal transmission line which corresponds to one or more circuits and transmits signals to a predetermined interface unit. A power supply line supplies the power supply voltage to at least the above-mentioned predetermined interface unit. A plurality of outlets connected to a supply line of the power supply voltage are connected with each other through a predetermined transmission line corresponding to the interface standards of the predetermined interface unit. A connecting part adapted to be connected with one of the plurality of outlets connects the signal transmission line and the power supply line with the predetermined transmission line and the supply line of the power supply voltage respectively through the one of the plurality of outlets.

Other features and advantages of the present invention will be apparent by reading the description given below.

BRIEF DESCRIPTION OF THE DRAWINGS

In the drawings, related figures are assigned the same reference number.

DETAILED DESCRIPTION OF THE PREFERRED EMBODIMENTS

Figure 1:
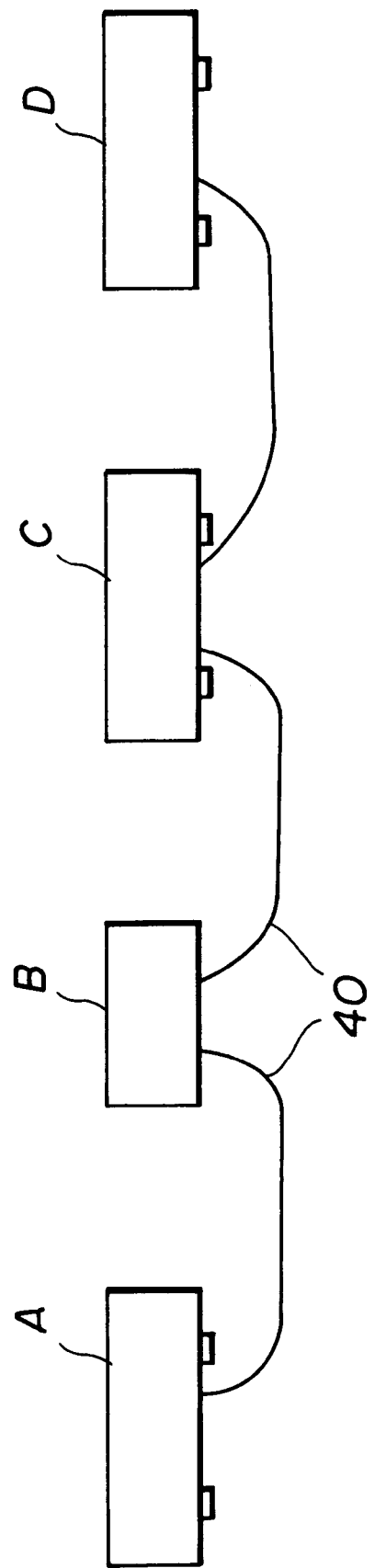
FIG. 1 is a diagram for describing the IEEE 1394 interface system and the cable arrangement between different devices.
Figure 2:
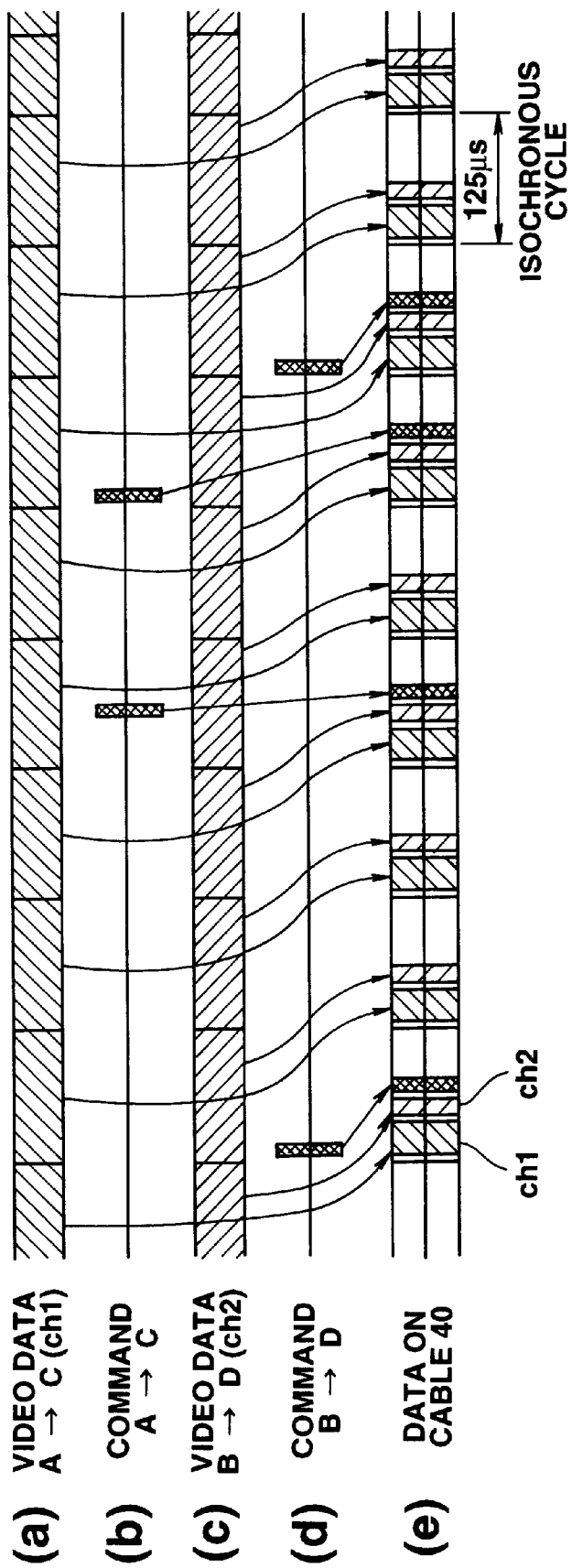
FIG. 2 is a diagram for describing the IEEE 1394 interface system and the isochronous transmission of data between different devices on the cable 40.
Figure 3:
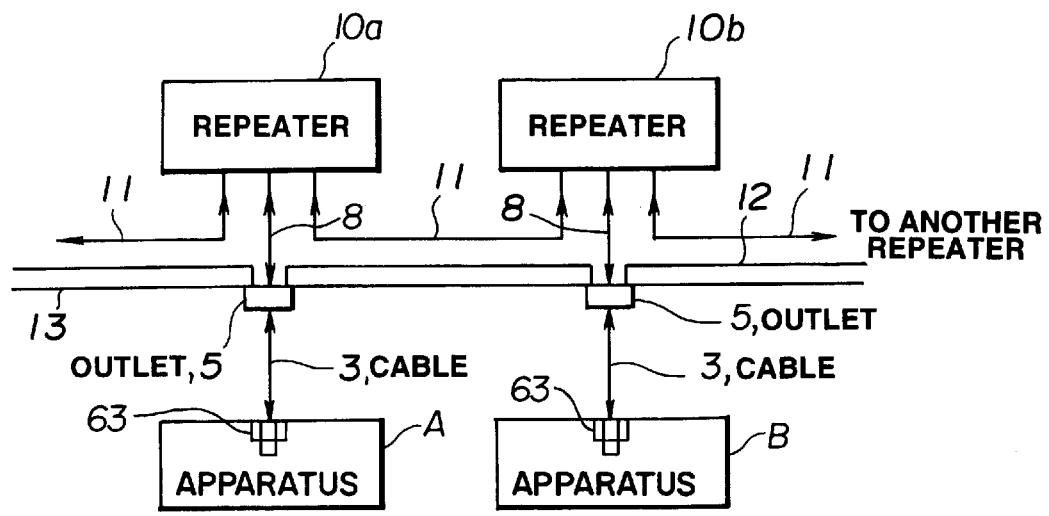
FIG. 3 shows an embodiment of a contact apparatus for the network according to the present invention.

In FIG. 3, the devices A and B are each an AV device equipped with a digital interface unit 63 complying with the IEEE 1394 standard or the like. The digital interface units 63 installed on the devices A and B are respectively connected with cables 3 including a bus such as the IEEE 1394 serial bus.

Figure 4:
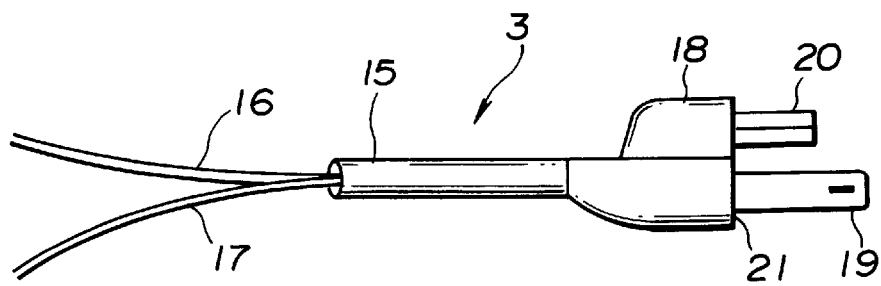
FIG. 4 is a diagram for describing a cable employed in an embodiment shown in FIG. 3.

FIG. 4 shows a representation of the cables 3. The cables 3 each have the same configuration. That is, they have a bus 16 covered with shielding material 15 and a power supply line 17. FIG. 4 shows the cable with the shielding material 15 partially removed. A plug 18 is attached at the ends of the cables 3. The plug 18 has a power supply male contact 19 which is connected with the power supply line 17 for AC power supply. In addition, the plug 18 has a bus male contact part 20 connected with the bus 16 in the cable 3. The connection of the plug 8 with the outlets 5 will be described hereinafter.

One end of the bus 16 is connected with the digital interface units 63 in the respective AV devices A or B, and the other end of the bus 16 is connected with the male contact 20. In this manner, data can be transmitted through the cables 3 connected between the devices A and B and the outlets 5. The power supply line 17 of the cables 3 can supply the devices A and B as well as the digital interface units 63 installed on such devices or the like with the power supplied to the outlets 5 respectively. Various input and output signals such as video, audio and control signals are transmitted through the bus 16.

The male contacts 19, 20 mounted at the end of the plug 18 are secured by a frame 21. By inserting the plug 18 in the outlets 5 the bus 16 is electrically connected with the power supply line 17.

Figure 5:
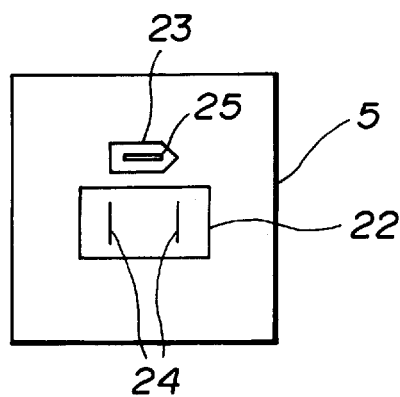
FIG. 5 is a diagram for describing a receptacle employed in an embodiment shown in FIG. 3.

FIG. 5 illustrates in further detail the outlets 5 shown in FIG. 3. Each outlet 5 has the same configuration. An AC power supply receptacle 22 contains female contacts 24 for receiving the bus male contact 19. The receptacle 23 has a female contact 25 for receiving the power supply male contact 20.

Returning momentarily to FIG. 3, the outlets 5 may be installed, for example, in the wall 13. On the rear side of the wall 13 extends the power cable 12 which is electrically connected with the female contacts 24 of the outlets 5. The female contacts 25 of the outlets 5 are electrically connected with repeaters 10a and 10b installed on the rear side of the wall 13 through the buses 8 respectively.

The repeaters 10a and 10b provide connection with the physical layer of a reference model for OSI (Open System Interconnection), which also may be called the OSI Reference Model. These repeaters 10a, 10b have a transmission signal distribution function to distribute input data to one or more circuits.

For example, the repeater 10a is equipped with one port for connection with the bus 8 between the outlet 5 and the repeater and two ports for connection with the inter-repeater bus 11. The repeater 10a transmits and receives data to and from the device A through the bus 8, outlet 5 and cable 3. In addition, the repeater 10a is connected with the repeater 10b through the bus 11, and at the same time connected with another repeater (not shown) through the bus 11, so as to transmit and receive the data to and from the repeater 10b and the other repeater. That is, the repeater 10a is recognized by other elements on the network, namely, other repeaters including the repeater 10b and all the devices connected with the network. The repeaters 10a, 10b function to relay data on the bus 11 and at the same time transmit data for the device A on the bus 11 to the device A.

The configuration of the repeater 10b is the same as that of the repeater 10a. It is recognized by other elements on the network and functions to relay data on the bus 11 and at the same time sends data from the device 2 through the bus 11 and transmits data for the device B on the bus 11 to the device B.

In FIG. 3, the cable 3 connects the device A with the outlet 5, and another cable 3 connects the device B with the outlet 5. It will be apparent that the cables 3 may be connected with any outlet. FIG. 3 illustrates two outlets 5 installed on the wall 13, but according to the needs of any particular network, one of ordinary skill in the art would understand that many outlets may be connected with each repeater as required.

The operation of the embodiment with such configuration is described below.

Assume that devices A, B are digital VCRs and that they are not connected with the network. Next, assume the user wants to dub reproduced data from the device A onto device B. To accomplish the dubbing, the user must connect the devices A, B with the network. That is, it is necessary for the user to connect the plug 18 at the end of the cable 3 connected with the interface unit of the device A with the outlet 5 on the wall 13. Similarly, it is also necessary for the user to connect the plug 18 at the end of the cable 3 connected with the interface unit 63 of the device B with the outlet 5 on the wall 13.

The plug the cable 3 into the wall outlet 5, the male contacts 19, 20 of the plug 18 are inserted in the female contacts 24, 25 of the receptacles 22, 23 respectively. By so doing, the device A and its interface unit 63 are connected with the power supply cable (not shown) through the power supply line 17 of the cable 3, the male contact 19 and the female contact 24 of the outlet 5. As a result, the power supply voltage is supplied to the interface unit 63. The power supply voltage is also supplied to the device B and its interface unit through the cable 3.

The interface unit of the device A is connected with the repeater 10a through the bus 16 of the cable 3, the male contact 20 and the female contact 25 of the outlet 5. Similarly, the interface unit 63 of the device B is connected with the repeater 10a through the cable 3, the outlet 5 and bus 8.

By this arrangement, the network may be automatically configured and physical ID is set for the devices A, B and the repeaters 10a, 10b. Therefore, as the devices A, B and the repeaters 10a, 10b participate in the network, a mutual connection is recognized and the data can be exchanged between the devices A, B.

Returning to the desire of dubbing data from device A to device B, the dubbing data from the device A is divided into packets by means of the interface unit 63. The resulting packet data is outputted through the bus 16 of the cable 3. The packet data is sent to the bus 8 through the outlet 5 and transmitted over the bus 11 through the repeater 10a. The repeater 10b transmits data on the bus 11 to the device B through the bus 8, the outlet 5 and the bus 16 of the cable 3.

The interface unit 63 of the device B reads the packet destination information from the data transmitted to the bus 16 and takes in a packet containing the destination information of its own. The interface unit 63 divides the packet data into individual packets and the device B records the dubbing data in packet form.

The repeaters 10a and 10b send the packet data to other repeaters (not shown).

Therefore, even when the device A sends data to a device other than the device B, as far as such devices are connected with the outlet, the data is sent to the appropriate device through the cable 3, the outlet 5, the repeater 10a and 10b and the like.

As described above, in the embodiment, not only a 1:1 connection but also the connection between a plurality of the devices becomes possible by installing a repeater. By installing an outlet 5 which is always connected with the repeater 10a, 10b when the power supply cable is connected, and by using the cable 3 containing the bus 16 and the power supply line 17 therein to connect the devices A, B with the outlet 5, the devices A, B participate in the network and data can be exchanged between a plurality of devices. The cable 3 contains the bus 16 and the power supply line 17 therein. Simply by inserting the plug 18 at the end of the cable 3 in the receptacles 23, 24, the network can be configured.

Figure 6:
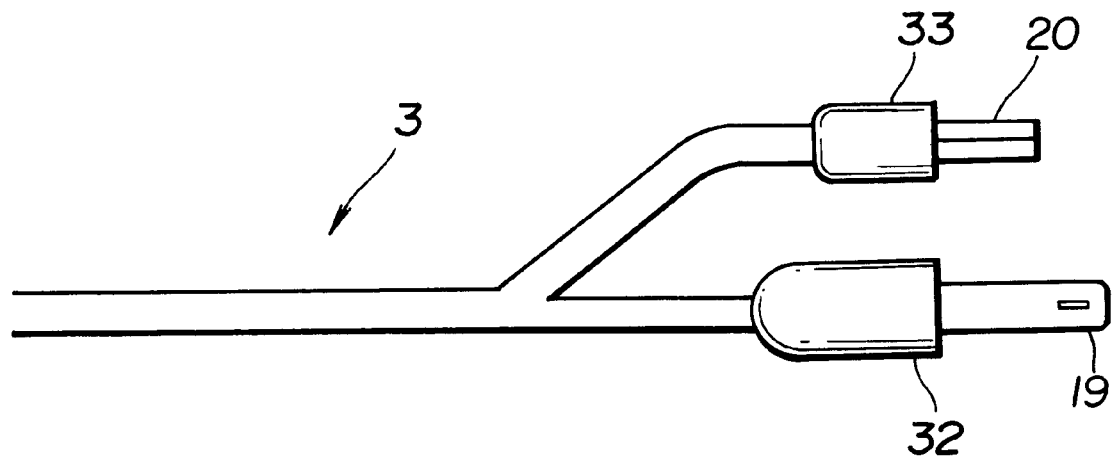
FIG. 6 is a diagram for describing a modified example of an embodiment shown in FIG. 3.

In FIG. 4, the power supply line 17 and the bus 16 are connected with the male contacts 19, 20 secured in a body by the frame 21 of the plug 18. FIG. 6 illustrates another embodiment of the invention wherein the cable 3 of FIG. 4 contains a forked end of the cable rather than a unitary plug 18. In FIG. 6, the forked end of the cable 3 is equipped with the power supply line plug 33 and the bus plug 32. The plug 32 has the male contact 19 to be connected with the power supply line 17 (shown in FIG. 4), and the plug 33 has the male contact 20 to be connected with the bus 16 (shown in FIG. 4).

By using the forked end having a separated power supply plug 33 and a bus plug 32 at the end of cable 3, the flexibility of the outlet shape, etc., is improved. Other operations and effects are the same as those of the embodiments shown in FIG. 4.

Figure 7:
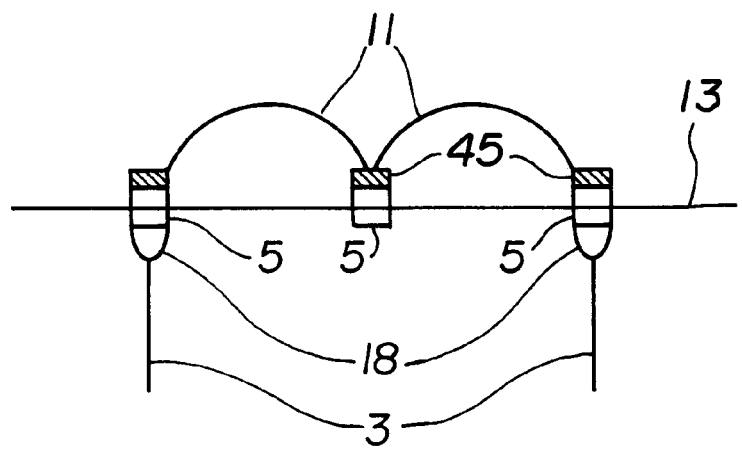
FIG. 7 is a diagram for describing another embodiment of the present invention.

FIG. 7 is a diagram for describing another embodiment of the present invention. In this embodiment, the repeater(s) can be omitted. FIG. 7 addresses a scenario related to FIG. 3. In FIG. 7, even though some of a plurality of outlets 5 is not connected to the devices, the receptacles are electrically connected with each other by the repeaters 10a, 10b. However, when the receptacles are connected with each other without using the repeater(s), the electrical connection between the receptacles are not assured. The embodiment shown in FIG. 7 addresses this situation.

The interface unit of each device (not shown) is respectively connected with each cable 3. Each cable 3 contains the power supply line 16 and the data transmission bus 17, as shown in FIG. 4. The plug 18 is connected with the end of the cable 3. The configuration of the cables 3 and the plug 18 is the same as that of the cables 3 and the plug 18 shown in FIG. 3.

In this embodiment, the plugs 18 are inserted into a plurality of outlets 5 equipped with receptacles (not shown) in a wall 13. The receptacles (not shown) have a similar configuration as the receptacles 22, 23 shown in FIG. 5. The outlet 5 is connected with the power supply cable (not shown) on the rear side of the wall 13. Therefore, by inserting the plug 18 in the outlet 5, the power supply voltage is applied to the devices (not shown) through the outlet 5, the plug 18 and the cable 3.

In the embodiment, the outlet 5 contains a switch 45 which functions to assure transmission of the signal on the rear side of the wall 13. The switch 45 is connected to the bus 16 of the cable 3 through the outlet 5. The switches 45 are connected with each other through the bus 11.

When the plug 18 is not inserted in the outlet 5, the switch 45 is on, connecting the cables with each other. Therefore, any outlet 5 in which the plug 18 is not inserted connects electrically two other outlets 5 that are connected with such a switch 45 through the bus cable 11. That is, the outlet 5 for which the switch 45 is on in order to simply pass on the data on the bus 11. In this regard, it is as though the outlet 5 without the plug 18 inserted were not present. On the other hand, when the plug 18 is inserted in the outlet 5, the switch 45 is off.

In this case, the plug 18 is connected with the bus 11 and to the switch 45 of the adjacent outlet 5. That is, the outlet 5 for which the switch 45 is off can exchange data with another outlets 5 connected to it through the bus 11.

As an example of a possible structure of the switch 45, the switch 45 comprises each contact installed at each end of a pair of opposing movable members (not shown) in the outlet 5. When the plug 18 is inserted in the outlet 5, the movable members (not shown) separate so the contacts open. When the plug 18 is not inserted in the outlet 5, the movable members draw near to each other and close the contacts. Thus, by inserting the plug 18 into the outlet 5 and pulling the plug 18 from the outlet 5, the switch 45 may be turned on and off.

The operation of the system with such a switch 45 is now described. Assume that the AV device (not shown) is connected with the network for dubbing purposes. The AV device with the original recording to be reproduced is connected to the system through cable 3 having plug 18 which is inserted into the leftmost outlet 5 in FIG. 7. The AV device containing a blank recording medium which will record the program is connected to the system through cable 3 having plug 18 which is inserted into the rightmost outlet 5 of FIG. 7.

No plug is inserted into the middle outlet S shown in FIG. 7.

The switches 45 for the rightmost and the leftmost outlets 5 in which the plugs 18 are inserted are turned off. The switch 45 for the middle outlet 5 in which no plug is inserted is turned on. Therefore, the switches 45 for the rightmost and the leftmost outlets 5 are connected with each other through the switch 45 for the middle outlet 5 in FIG. 7 and the bus 11.

The dubbing data from the device having the original recording (now shown) passes through the cable 3, the plug 18 through the switch 45 in the leftmost outlet 5 to the cable 11, as shown in FIG. 7. The data on cable 11 then passes through the switch 45, which is on, of the middle outlet 5, and continues through cable 11 to the switch 45 in the rightmost outlet 5, through the plug 18 and cable 3 to the recording device(not shown). Thus, dubbing is performed.

When the plug 18 of the cable 3 connected from an AV device (not shown) is connected to the middle outlet 5 in FIG. 7, the switch 45 for the outlet 5 is turned off. Therefore, it becomes possible to exchange data between the device connected to the middle outlet 5 and the devices connected to the rightmost and the leftmost outlets 5. Furthermore, even with a device connected to the middle outlet 5, it remains possible to transfer data between the device connected to the leftmost outlet 5 and the rightmost outlet 5.

As described above, the embodiment shown in FIG. 7 can accomplish the same results as the embodiment shown in FIG. 3, but with the repeater omitted. The embodiment of FIG. 7 can use a repeater or repeaters, if so desired. It will be apparent to one of ordinary skill in the art that this embodiment can employ the repeaters shown in FIG. 3. Furthermore, one receptacle can be connected with a plurality of receptacles by connecting a cable containing a plurality of signal lines with advice equipped with input/output parts corresponding to the number of signal lines.

Figure 8:
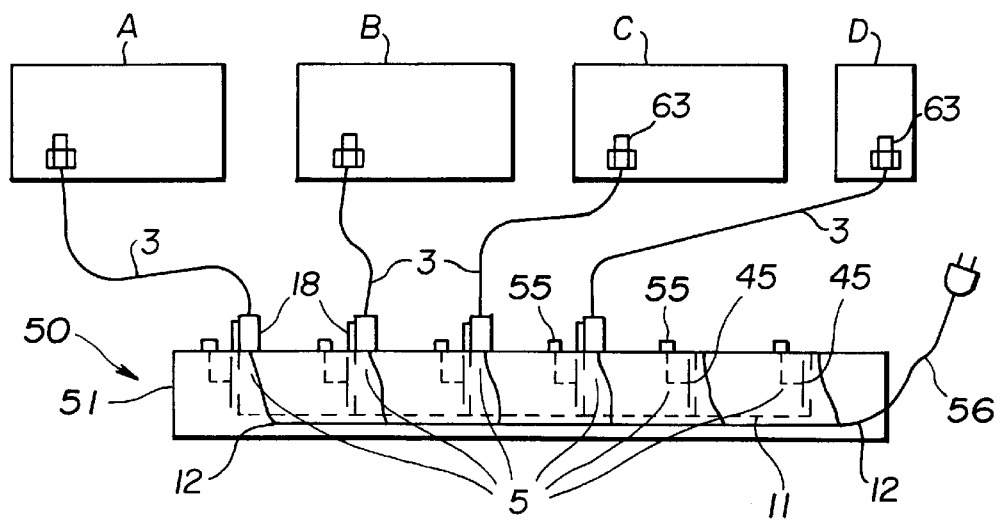
FIG. 8 is a diagram for describing further another embodiment of the present invention.

In addition to the system being applied in wall outlets 5 as described above, a more portable system can be employed wherein a plurality of outlets 5 can receive a plurality of plugs 18 connected to cables 3, which in turn are connected to one of a plurality of AV devices. FIG. 8 illustrates such an embodiment.

In FIGS. 3, 7 and 8, the same components bear the same reference number with the omission of their description. In the case of the embodiment shown in FIG. 8, the outlets 5 are not installed on the wall but on a table tap 50.

The table tap 50 comprises a casing 51 equipped with a plurality of outlets 5 in which plugs 18 are inserted. The outlets 5 each have receptacles (not shown) in which the plug 18 is inserted. The outlet receptacles of FIG. 8 are similar to the receptacles 22 and 23 of FIG. 5. When a plug 18 is inserted in the receptacles, the receptacles are connected to the interface unit 63 of one of the devices A, B, C, or D through the cable 3. The outlet 5 in the table tap 50 has a similar configuration as that shown in FIG. 5 with a signal transmission contact part 22 and a power supply line contact part 23. As described above in the discussion of FIG. 4, cable 3 contains a power supply line 17 and a data transmission bus 16. In this embodiment, the connection between the outlets 5 through the transmission bus 11 in the table tap 50 is achieved or cut off by means such as the switch 45, and by other equivalent means which are known to those of ordinary skill in the art.

An operating part 55 of each switch 45 protrudes from the casing 51 of the table tap 50. By depressing the operating part 55, the mutual connection between the outlets 5 through the bus 11 can be turned on and off.

Each outlet 5 is connected to a network power supply line 12 in table top 50. The network power supply line 12 is connected to power supply cable 56. The power supply voltage supplied through the power supply cable 56 is fed to the respective AV device A, B, C, or D through the power supply line 12 to the cable 3 of the plug 18 inserted in the respective outlet 5.

In the embodiment shown in FIG. 8, the AV device A, B, C, or D can participate in the network by inserting the respective plug 18 into an available outlet 5 of the network. The plug 18 at the end of the cable 3 is connected to its associated device A, B, C, or D via an interface unit 63 in the AV device. The user can have the device A, B, C, or D participate in the network by depressing the operating part 55 of the switch 45. By so doing, data can be exchanged between the devices A, B, C and D.

As described above, the embodiment of FIG. 8 can achieve the same results as the embodiments shown in FIGS. 3 and 7.

In the above description, the casing 51 is equipped with the same outlets 5, network bus transmission line 11 and switches 45 as those shown in FIG. 7. However, it will also be apparent that the table tap 50 embodiment of the present invention may also employ repeaters 10*a* and 10*b* as those of the embodiment shown in FIG. 3. It will also be apparent to one of ordinary skill in the art that other conceivable means may be employed to the general structure provided. For example, a wall 13 application and a table tap 50 application have been described, but other equivalent ways of using the disclosed network connecting system may also be employed and are considered part of the scope of the present disclosure and invention.

Figure 9:
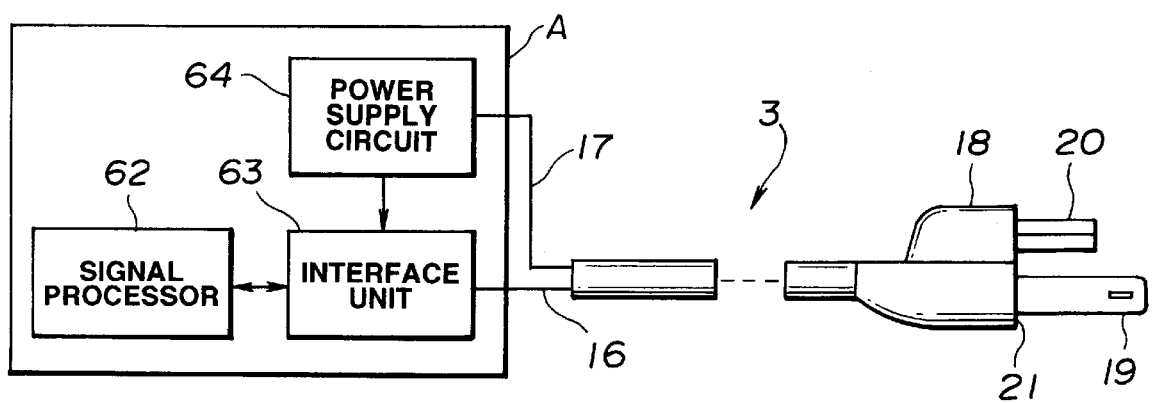
FIG. 9 is a diagram for describing further another embodiment of the present invention.

FIG. 9 shows another embodiment according to the present invention. In FIGS. 4 and 9, the same components bear the same reference number with the omission of their description. In each embodiment mentioned above, when any device is newly connected with the network by inserting the plug 18 in the outlet 5 or when any device is disconnected from the network by pulling out the plug 18 from the outlet 5, the network is reconfigured. In addition, when the power switch of a predetermined device is turned off with such device still connected to the network, the network is reconfigured. In the embodiment of FIG. 9, such reconfiguration can be avoided.

As illustrated in FIG. 9, the device A is equipped with a predetermined signal processor 62 and the interface unit 63 as well as a power supply circuit 64. The signal processor 62 processes data exchanged with the predetermined interface unit 63 as specified. The interface unit 63 corresponds to the digital interface standards such as the IEEE 1394 standard, for example. It divides data from the signal processor 62 into packets and converts the resulting packets into the signal corresponding to the predetermined interface standard. Such a signal is sent out through the bus 16 in the cable 3 and at the same time divides packet data received through the bus 16 into packets to send them to the signal processor 62.

In the embodiment, the power supply line 17 accommodated in the cable 3 is connected with the power supply circuit in the device 61. The power supply circuit 64 can be always supplied with the power supply voltage through the power supply line 17. Therefore the interface unit 63 is always supplied with the power supply voltage regardless of the ON/OFF state of the power switch of the device A.

In the embodiment, when the plug 18 associated with the cable 3 is inserted in the outlet 5 (not shown), the power supply voltage is supplied to the power supply circuit 64. Under this condition, the power supply circuit 64 can supply the power supply voltage to the interface unit 63 to drive it. Therefore, the interface unit 63 is always driven, so it is connected with the network regardless of ON/OFF of the power switch of the device A.

When the present invention is applied to the IEEE 1394 interface standards, the same functions as those of a repeater (not shown in FIG. 9) can be maintained and the reconfiguration of the network can be avoided by supplying the power to the physical layer of the OSI reference model.

As described above, even though the power switch of the device A is turned off, the reconfiguration of the network can be avoided. Therefore, it is possible to turn off the power to a predetermined device without adversely affecting other devices.

It will be apparent that various embodiments in a wide range can be achieved according to the present invention without departing from the spirit and the scope of the present invention. The present invention is limited only by the appended claims and not by any specific embodiment.

What is claimed is:

1. A contact apparatus for a network, comprising:

at least one cable, each cable comprising a signal transmission line which transmits signals to a respective device and a power supply line supplying power to said respective device;

a bus contact part and a power supply contact part each provided at a first end of said cable and electrically connected to said signal transmission line and said power supply line, respectively;

a plurality of outlets, each having a bus receptacle and a power supply receptacle electrically connectable to said bus and power supply contact parts, respectively;

a plurality of switches for distributing input data to the one or more of said respective devices respectively connected to one of said plurality of outlets;

a network bus transmission line connecting said plurality of switches to each other; and a casing accommodating said plurality of outlets, said plurality of switches and said network bus transmission line.

2. A contact apparatus for a network, comprising:

at least one cable, each cable comprising a signal transmission line which transmits signals to a respective device and a power supply line which supplies power at least to said respective device;

a bus contact part and a power supply contact part each provided at a first end of said cable and electrically connected to said signal transmission line and said power supply line, respectively;

a plurality of outlets each having a bus receptacle and a power supply receptacle electrically connectable to said bus and power supply contact parts, respectively;

a network transmission line connected to each of said bus receptacles of said plurality of outlets;

a plurality of signal transmission switches which transmit signals through said network transmission line when said bus contact part is not connected to a corresponding bus receptacle; and a casing for accommodating said plurality of outlets, said bus transmission line and said plurality of signal transmission switches.

* * * * *